(12) United States Patent
Saes

(10) Patent No.: US 9,979,477 B2
(45) Date of Patent: May 22, 2018

(54) METHOD FOR DRIVING A LIGHT SOURCE, A DRIVER SYSTEM TO DRIVE A LIGHT SOURCE AND A LUMINAIRE COMPRISING SAID LIGHT SOURCE AND DRIVER SYSTEM

(71) Applicant: EldoLAB Holding B.V., Son en Breugel (NL)

(72) Inventor: Marc Saes, Son en Breugel (NL)

(73) Assignee: EldoLAB Holding B.V., Son en Breugel (NL)

( * ) Notice: Subject to any disclaimer, the term of this patent is extended or adjusted under 35 U.S.C. 154(b) by 0 days. days.

(21) Appl. No.: 15/320,553

(22) PCT Filed: Jun. 25, 2015

(86) PCT No.: PCT/NL2015/050462
§ 371 (c)(1),
(2) Date: Dec. 20, 2016

(87) PCT Pub. No.: WO2015/199538
PCT Pub. Date: Dec. 30, 2015

(65) Prior Publication Data
US 2017/0294962 A1    Oct. 12, 2017

(30) Foreign Application Priority Data
Jun. 27, 2014    (NL) ...................... 1040869

(51) Int. Cl.
H05B 37/02      (2006.01)
H04B 10/116     (2013.01)

(52) U.S. Cl.
CPC ....... *H04B 10/116* (2013.01); *H05B 37/0272* (2013.01); *H05B 37/02* (2013.01)

(58) Field of Classification Search
CPC .. H05B 37/02; H05B 37/0272; H05B 33/086; H05B 33/0863; H05B 33/0842;
(Continued)

(56) References Cited

U.S. PATENT DOCUMENTS 6,808,307 B1 * 10/2004  Aslan ................ G01K 1/026
                                                       374/178
9,253,839 B2 * 2/2016  Saes ................... H05B 33/086
(Continued)

FOREIGN PATENT DOCUMENTS

EP    2503852 A1    9/2012
EP    2509398 A1    10/2012
(Continued)

*Primary Examiner* — Haissa Philogene
(74) *Attorney, Agent, or Firm* — Hoffmann & Baron, LLP

(57) ABSTRACT

A method for driving a light source includes the following steps: a. providing a code to be transmitted by the light source; b. converting the code into a sequence of different current levels, which current levels are maintained for a predetermined period of time; and c. providing the sequence of different current levels to the light source such that the light source emits light at different intensity levels, where driving the light source is carried out using a set-point update rate having a set-point update period, and where transitions between the different current levels take more than one set-point update period.

14 Claims, 4 Drawing Sheets

(58) Field of Classification Search
CPC ............ H05B 41/3921; H05B 41/3925; H05B 37/0281; H05B 33/0857; H05B 33/0845; H05B 33/0896; H05B 33/0815; H04B 10/116; H04B 10/54; H04B 10/548; G09G 3/32; G09G 2320/0233; G09G 3/3406
See application file for complete search history.

(56) References Cited

U.S. PATENT DOCUMENTS

| | | | |
|---|---|---|---|
| 9,363,857 B2* | 6/2016 | Feri | H05B 37/0272 |
| 9,379,814 B2* | 6/2016 | De Bruijn | H05B 37/0272 |
| 2005/0134188 A1 | 6/2005 | Lindqvist | |
| 2006/0237636 A1* | 10/2006 | Lyons | F21K 9/00 250/228 |
| 2011/0018465 A1* | 1/2011 | Ashdown | H05B 33/0818 315/294 |

FOREIGN PATENT DOCUMENTS

| | | |
|---|---|---|
| WO | 2009/090511 A2 | 7/2009 |
| WO | 2009/136309 A2 | 11/2009 |
| WO | 2013/001408 A1 | 1/2013 |

* cited by examiner

METHOD FOR DRIVING A LIGHT SOURCE, A DRIVER SYSTEM TO DRIVE A LIGHT SOURCE AND A LUMINAIRE COMPRISING SAID LIGHT SOURCE AND DRIVER SYSTEM

CROSS-REFERENCE TO RELATED APPLICATIONS

This application is the National Stage of International Application No. PCT/NL2015/050462 filed Jun. 25, 2015, which claims the benefit of Netherlands Application No. NL 1040869, filed Jun. 27, 2014, the contents of which is incorporated by reference herein.

FIELD OF THE INVENTION

The invention relates to a method for driving a light source, a driver system to drive a light source and a luminaire comprising a light source and a driver system to drive the light source, wherein the method, driver system and luminaire are in particular used for transmitting code using light emitted by the light source.

BACKGROUND OF THE INVENTION

Light sources are used everywhere to produce light. Examples are indoor/outdoor lamps, TVs, traffic signs, commercial displays, car headlights/taillights, etc. a code, i.e. digital information, may be incorporated into the emitted light by modulating the light source, turning them on and off. This principle may be referred to as Visible Light Communication or VLC. When the modulation is fast enough, i.e. turning the light source on and off is done rapidly, the incorporation of digital information into the emitted light is unperceivable to the human eye.

Hence, VLC uses the phenomenon that if a frequency of an intermittent light stimulus is above a so-called flicker fusion threshold, the intermittent light stimulus appears to be completely steady to the average human observer. However, as the ability to detect flicker is dependent amongst other on physiological factors of the human observer such as age and fatigue, there is still a high risk of a human observer detecting flicker in current VLC systems. Further, even if no flicker is observed, the modulation of the light source might cause nausea.

Besides the negative effects on human observers, the modulation of the light source might interfere with optical read-out apparatus, e.g. bar-code readers, smartphone cameras, etc., which receive the light emitted by the light source while detecting other codes and information such as bar codes.

SUMMARY OF THE INVENTION

Hence, it is an object of the invention to reduce one or more of the abovementioned negative effects of the modulation of the light source in VLC.

This object is achieved by providing a method for driving a light source, wherein said method comprises the following steps:
a. providing a code to be transmitted by the light source;
b. converting the code into a sequence of different current levels, which current levels are maintained for a predetermined period of time; and
c. providing the sequence of different current levels to the light source such that the light source emits light at the different intensity levels,
wherein driving the light source is carried out using a set-point update rate having a set-point update period, characterized in that
transitions between the different current levels take more than one set-point update period.

In accordance with the present invention, a light source is driven by means of using set-points, whereby the set-points are provided at a set-point update rate. This update rate may be fixed or predetermined or may be varied when driving the light source. Typically, a set-point is updated after a set-point update period has lapsed. Such a set-point update period may also be fixed or may be varied. Because the generation of consecutive set-points may require some processing time, often a minimal set-point update period is applied.

In accordance with the present invention, a transition between different current levels is applied gradually, i.e. spanning more than one set-point update period.

In an embodiment, such a transition from one current level to another, different, current level includes using at least one intermediate set-point value in a range between, but not including, a first set-point value corresponding to the one current level and a second set-point value corresponding to the other current level.

An advantage of spreading the transition over more than one set-point update period is that an average slope of the current during the transition from one current level to another current level is reduced compared to the traditional transitions which are carried out in a single set-point update period. Reducing the average slope has the advantage that the change in intensity level of the emitted light is less fast resulting in less flicker being perceived by a human observer. Reducing the average slope and thus obtaining a less fast change in intensity level of the emitted light may further be advantageous in reducing the interference with optical read-out apparatus as for instance the auto-calibration of the apparatus may now be able to follow the environmental light change fast enough and/or the apparatus is able to obtain an image with an improved focus.

Limiting the slope of the current, i.e. spreading the transition over more than one set-point update period, is contradictory to the usual way of driving a light source in which it is the aim to switch between different current levels as fast as possible, such that the resulting waveform resembles a square waveform as much as possible.

In an embodiment, only two different current levels are used, which two different current levels are alternated, and wherein the frequency with which the two different current levels are alternated is varied to form the code. In other words, the frequency with which the two different current levels are alternated needs to be analysed in order to obtain the code contained in the modulated light. The duty cycle of the waveform may be constant throughout sending the code in order to set the average light intensity emitted by the light source at a desired level.

In an alternative embodiment, three or more different current levels are used, wherein a substantially fixed frequency is used to alternate between different current levels, and wherein the order of the three or more different current levels forms the code. In other words, the shape of the waveform needs to be analysed to obtain the code contained in the modulated light.

In an embodiment, the average intensity of the emitted light is determined by the duty cycle of the modulated light source. Hence, adjusting the duty cycle of the modulated light source the average intensity of the by the light source emitted light can be adjusted.

In an embodiment, the average intensity of the emitted light is monitored and the duty cycle is adapted to compensate for deviations from a desired average intensity.

In an embodiment, the code is converted into a sequence of different non-zero current levels. Hence, a zero current level is not used to drive the light source. This will prevent the intensity of the light source from dropping to zero (dark), so that less flicker is perceived. Further, as the light source is always emitting light at some non-zero intensity, there is always light available for other optical read-out devices to perform their read-out function. Hence, the risk of interference is reduced. Using a non-zero current level will usually result in a reduction of the absolute value of the difference between the different current levels, which also aids in reducing the risk of flicker and interference.

In an embodiment, the frequency with which is alternated between different current levels is above 120 Hz, preferably above 150 Hz and more preferably above 200 Hz.

In an embodiment, a sequence of codes is transmitted by the light source, wherein in between the transmittal of the respective codes a constant current is provided to the light source for a predetermined period of time. This is especially beneficial when the transmitted code is relatively short. The sequence of codes may be a sequence of identical codes that are repeated over and over again, for instance when the code comprises information about the location of a light source within a building, but the codes may also vary when there is more interaction.

The invention also relates to a driver system comprising a power source, a light driver converting the energy from the power source into a form that is suitable to be supplied to a light source, and a control unit to control the amount of energy outputted by the light driver, wherein the control unit is configured to carry out the method according to the invention using the light driver and the modulator. In an embodiment, the driver system comprises a modulator to modulate the energy outputted by the light driver under control of the control unit, wherein the control unit is configured to carry out the method according to the invention using the light driver and the modulator.

The invention further relates to a luminaire comprising a light source and a driver system according to the invention.

BRIEF DESCRIPTION OF THE DRAWINGS

The invention will now be described in a non-limiting way by reference to the accompanying drawings in which like parts are indicated by like reference numerals, and in which.

DETAILED DESCRIPTION OF THE INVENTION

Figure 1A:
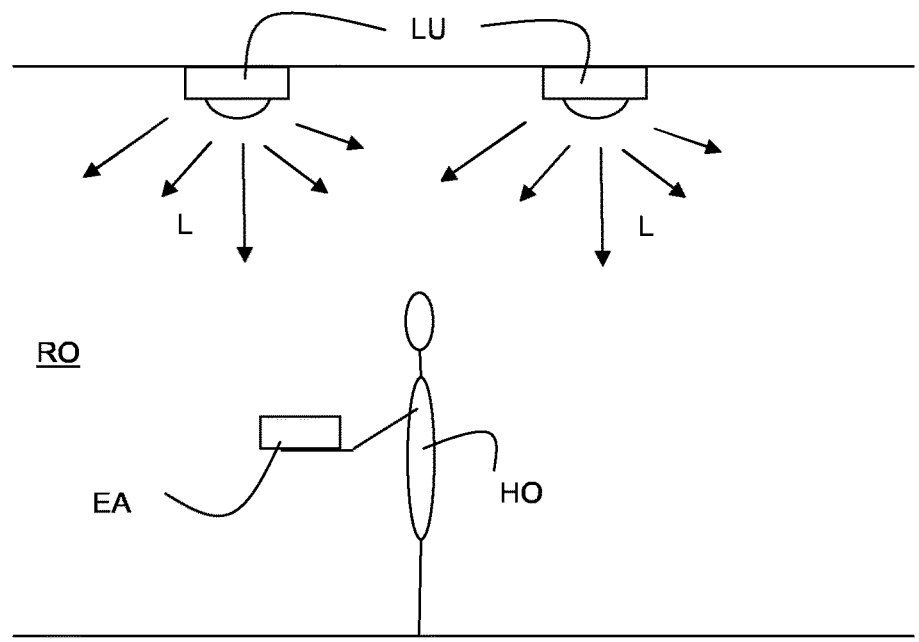
FIG. 1a depicts schematically a room in which visible light communication is used.

FIG. 1a depicts schematically a room RO with two overhead luminaires LU, each luminaire comprising a light source and a driver system, to emit light L for illuminating the room RO.

FIG. 1a further depicts a human observer HO positioned inside the room RO and holding an electronic apparatus EA such as a smartphone.

When the luminaires LU are used in a traditional manner, they emit a constant intensity level or the light sources are modulated at a fixed frequency, which frequency is preferably high enough to be unperceivable by the human observer HO, e.g. above 120 Hz, preferably above 150 Hz and more preferably above 200 Hz. However, the luminaires LU may have an additional function to emit a code that is still unperceivable by the human observer HO, but can be detected by the electronic apparatus EA. Incorporating a code into the emitted light can be done by varying the modulation of the light source. For instance, the modulation frequency may be varied between a high frequency and a low frequency, wherein the low frequency represents a digital zero or "0" and the high frequency represents a digital one or "1", so that a digital binary code may be obtained and broadcasted by the luminaires by appropriate switching between the low and high modulation frequencies. This additional function is usually referred to as Visible Light Communication and will be abbreviated to VLC from now on.

The electronic apparatus EA comprises a camera or other optical detection device to be able to receive the light L from the luminaires and determine the code contained in the light L. A known mechanism is to use a roller-shutter mechanism converting the emitted light in an image of dark and bright lines that can be processed by a processor of the electronic apparatus to determine the code contained in the image.

Once the code is received and determined by the electronic apparatus EA, the code may be used by the electronic apparatus to inform the human observer HO, for instance about its location inside the room RO. For this purpose the electronic apparatus contains dedicated software or communicates with another device containing a dedicated piece of software and using the code to transmit information to the human observer HO, e.g. by using a display on the electronic apparatus EA.

Figure 1B:
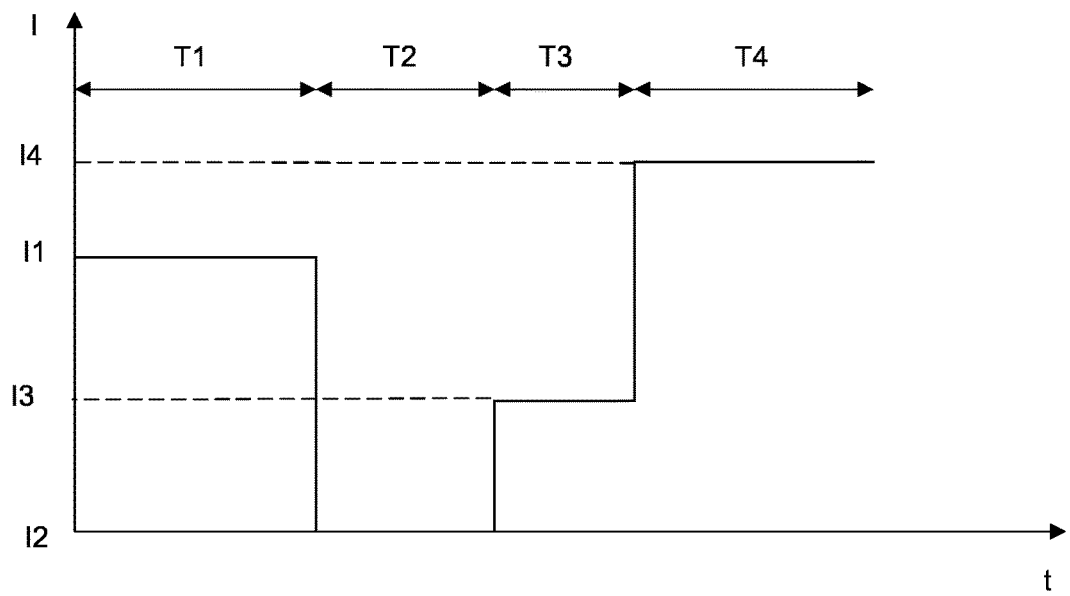
FIG. 1b depicts schematically a sequence of current levels that are maintained for predetermined periods of time, representing a code.

FIG. 1b schematically shows a particular sequence of different current levels, each current level being maintained for a predetermined period of time, such sequence e.g. representing a particular code or message which may be retrieved by an electronic apparatus such as apparatus EA shown in FIG. 1a. The sequence as shown in FIG. 1b consists of a sequence of current levels I1, I2 (equal to zero), I3 and I4 which are maintained respectively for periods T1, T2, T3 and T4. Such a sequence may e.g. represent one or more characters of a message or code. In order to generate such a sequence of current levels, a driver system of a luminaire typically generates a sequence or array of set-points, representing the desired current. By such a variation of the current set-point, also referred to as modulation of the current, different intensity levels are generated, which may be observed by an electronic apparatus such as apparatus EA of FIG. 1a. Typically, the rate at which a set-point can be updated or regenerated is limited by the processing speed of the driver system.

Figure 2A:
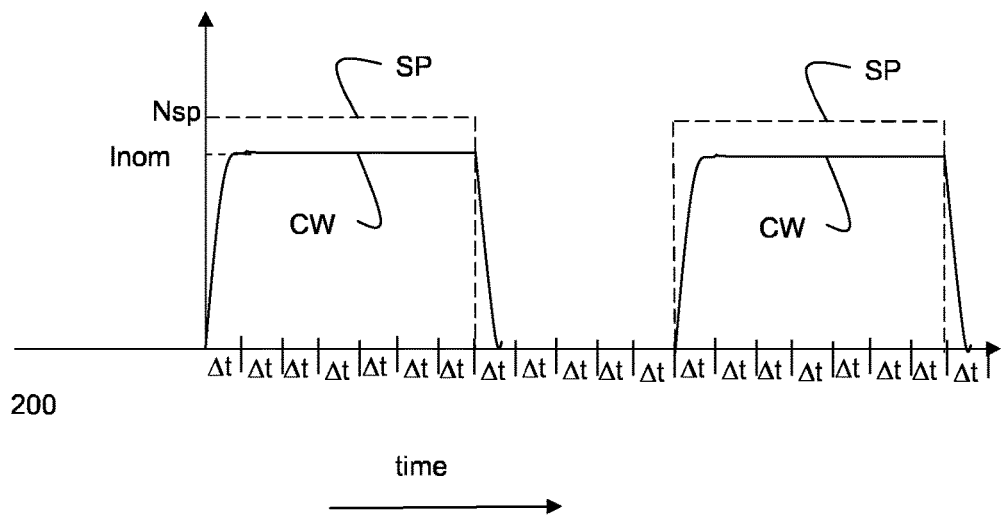
FIG. 2a depicts a diagram representing prior art modulation of the light source.

FIG. 2a depicts a diagram representing prior art modulation of a light source. A driver system driving the light source may be characterized in that it defines a set-point update rate with a corresponding set-point update period Δt, which is, in an embodiment, the smallest time period possible to change from a first set-point value to a second set-point value. Within the meaning of the present invention, said smallest time period possible may also be referred to as the minimal set-point update period. In digital systems, the set-point update rate may be determined by the sample rate and/or clock rate of a respective control unit. In such systems, the set-point update period may be a fixed, predetermined or predefined period. In analog systems, the set-point update period may e.g. correspond to a minimum settling time period required to change from one set-point to another.

The diagram depicts a generated set-point SP for the current through the light source, said set-point SP alternating between a nominal set-point value Nsp and a zero (0) value. The set-point SP is thus an ideal square waveform. The driver system trying to follow the current set-point SP will in practice obtain a current waveform CW through the light source alternating between a nominal current Inom corresponding to the nominal set-point value Nsp and a zero (0) value. Hence, in practice the driver system will not output an ideal square waveform as the current requires a certain period of time to settle, which period of time to settle is preferably smaller than the set-point update period in digital systems. Not shown in FIG. 2a is that the static part of the current waveform CW may have some ripple due to electronic phenomena such as hysteresis of an inductor.

In the prior art, in order to get as close as possible to the ideal square waveform, the set-point is changed from zero to Nsp as fast as possible, i.e. the transition between the current levels zero and Inom, or in general between a first current level which is to be maintained for a first period and a second, different, current level, which is to be maintained for a second period, takes at most a single set-point update period Δt. When using this waveform in VLC, human observers might still perceive flicker or nausea may be caused and/or the VLC interferes with other optical read-out devices, e.g. bar code readers.

In the prior art, a transition from a first current level to a second, different current level is thus realised by changing the set-point from one value corresponding to the first current level to another value corresponding to the second current level, within one set-point update period Δt. This is illustrated in FIG. 2b.

Figure 2B:
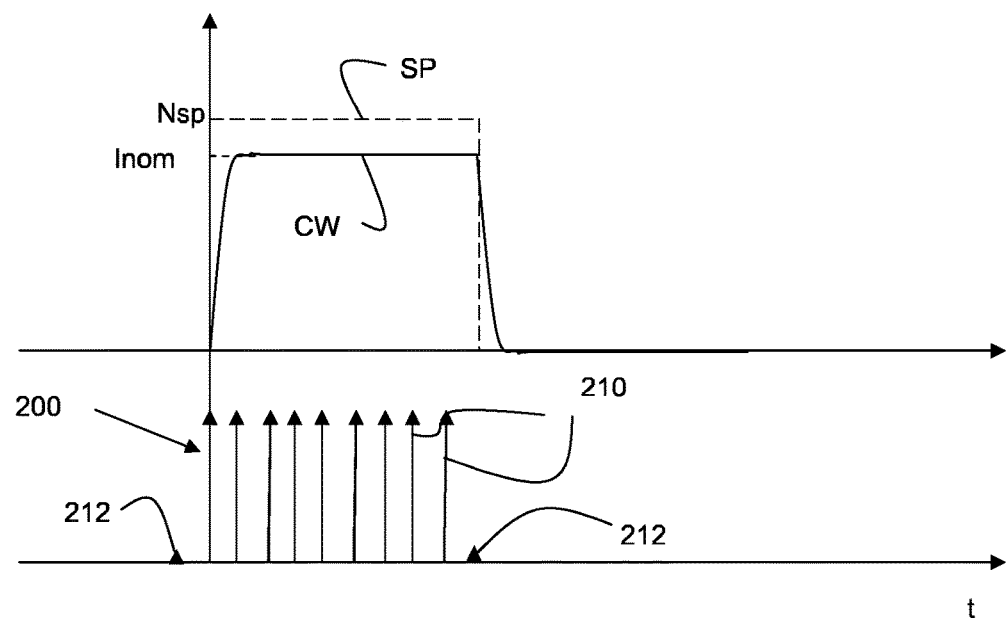
FIG. 2b depicts a diagram including an array of set-points to obtain a current modulation as applied in the prior art.

FIG. 2b schematically depicts an array of set-points 200 as applied in the prior art for the transition from a current level equal to zero, to a current level equal to Inom and back to a current level equal to zero. The set-points as schematically indicated by the arrows 210, 212 (arrows 212 representing a set-point value equal to zero) are spaced apart over a period equal to the set-point update period Δt as shown in FIG. 2a.

The dotted graph SP shows, as in FIG. 2a, the envelope of the array of set-points as applied, whereas graph CW shows the corresponding current waveform CW through the light source alternating between a nominal current Inom corresponding to the nominal set-point value Nsp and a zero (0) value.

Figure 3A:
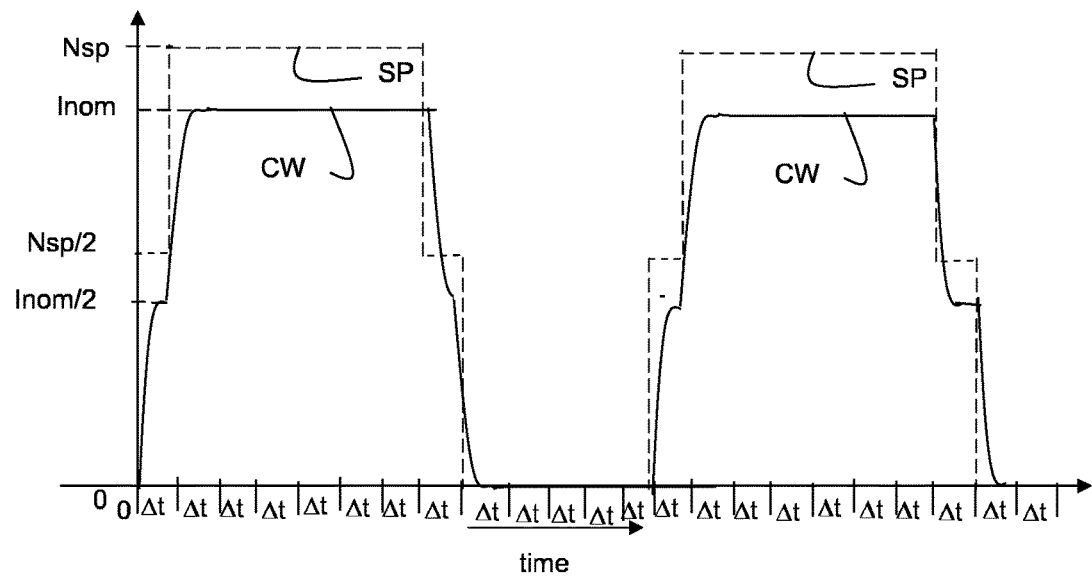
FIG. 3 depicts a diagram representing modulation of the light source according to an embodiment of the invention.

FIG. 3a depicts a diagram representing modulation of a light source in accordance with the invention. A driver system according to the invention and driving the light source is characterized in that it defines a set-point update rate with a corresponding set-point update period Δt, which is the smallest time period possible between different set-point values. The set-point update period Δt may for instance be 26 μs, which has the advantage that it is compatible with 50 Hz, 60 Hz and high speed (3.3 ms) video cameras.

When a code is to be emitted by the light source, the code is converted into a sequence of different current levels, which current levels are maintained for a predetermined period of time. In this example, the current levels making up the code are the Inom value and the zero (0) value which correspond to the nominal set-point value Nsp and the zero (0) value, respectively.

In accordance with the present invention, care is taken to realise a gradual change between a first current level and a second, different, current level, thereby making use of one or more intermediate set-point values in a range between, but not including, a first set-point value (associated with or corresponding to the first current value) and a second set-point value (associated with or corresponding to the second current value).

As shown in FIG. 3a, the set-point SP generated makes use of an intermediate level of value 0.5 Nsp for one set-point update period Δt when switching between the Nsp value and the zero value. As a result thereof the transitions between different current levels making up the code take more than one set-point update period Δt, so that the average slope during the transition is less steep than in the prior art method of modulating the light source as for instance shown in FIG. 2a or 2b. Comparing FIGS. 2b and 3a, it takes the current CW in FIG. 3a approximately two times the set-point update period Δt to reach the nominal value Inom, whereas in FIG. 2b, the nominal value is reached after approximately one set-point update period Δt.

Figure 3B:
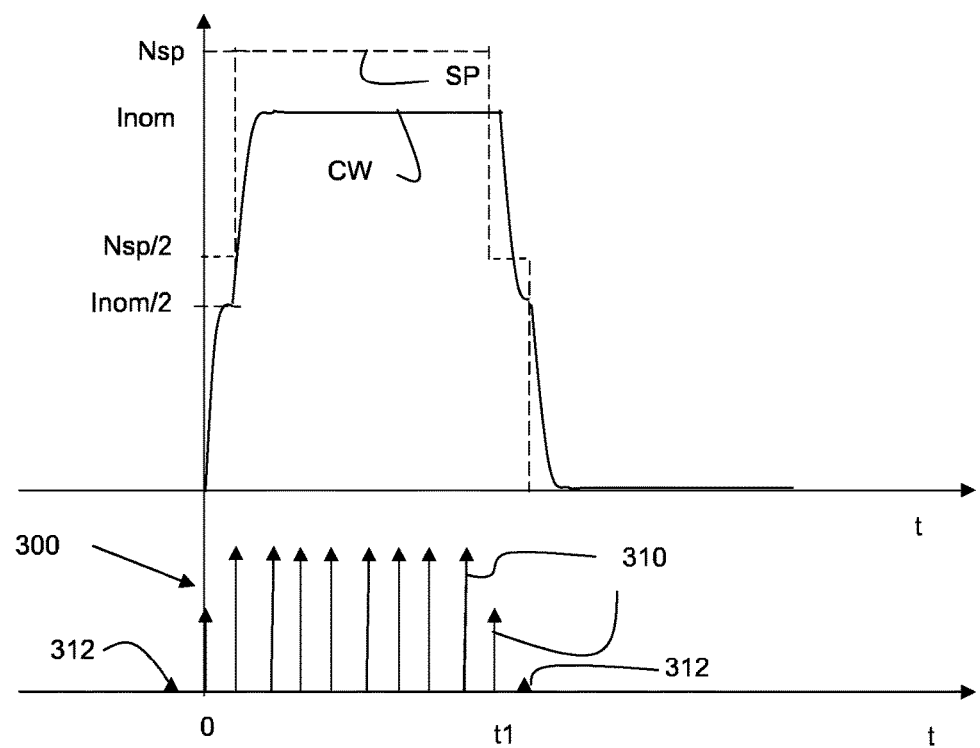

FIG. 3b schematically shows an array of set-points 300 as may be applied in an embodiment of the present invention to realise the current transition as shown in FIG. 3a. The set-points as schematically indicated by the arrows 310, 312 (arrows 312 representing a set-point value equal to zero) are spaced apart over a period equal to the set-point update period Δt as shown in FIG. 3a.

The dotted graph SP shows, as in FIG. 3a, the envelope of the array of set-points as applied, whereas graph CW shows the corresponding current waveform CW through the light source alternating between a nominal current Inom corresponding to the nominal set-point value Nsp and a zero (0) value. In contrast to the array of set-points as shown in FIG. 2a, the array of set-points 300 does not change from a value equal to zero to a value equal to Nsp instantaneously but, in the embodiment as shown, there is an intermediate set-point value Nsp/2 applied at instances t=0 and t=t1, thereby realising a more gradual change in current I when the current is to change from I=0 to I=Inom.

As the intensity of the emitted light changes more gradually, the chance of a human observer perceiving the intensity change as flicker is reduced. Further, other optical read-out devices such as a bar code scanners have more time to adapt itself to the changing intensity, thereby reducing the interference with these devices.

As the transitions between different current levels take more time, they also have a larger impact on the average intensity emitted by the light source. When only two different current levels are used, the impact of the transitions on the intensity is the same each time, so that a constant compensation factor can be used to adapt the predetermined time a current level is maintained in order to obtain a desired average intensity level. Hence, the duty cycle may be adjusted to compensate for deviations from a desired average intensity.

When more than two different current levels are used to form the code, the impact of the transitions on the intensity becomes dependent on the change between current levels. In such a case, compensation may be done over multiple pulses.

In an embodiment, it is possible to make an accumulative buffer to keep track of the intensity level during transitions and the deviations from the ideal square wave form, so that the value of the buffer can be used to compensate the predetermined periods a current level is maintained for the observed deviations, e.g. by adjusting the duty cycle.

Figure 4:
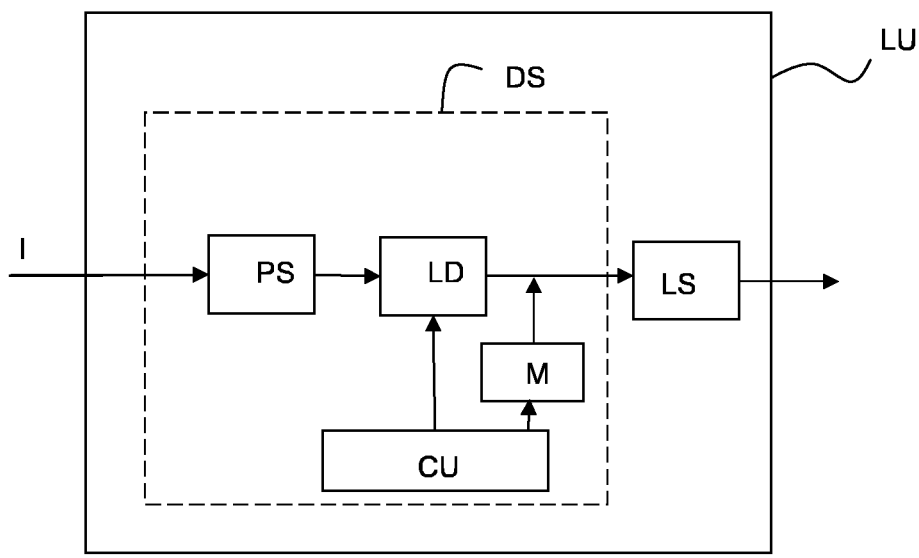
FIG. 4 depicts schematically a luminaire according to an embodiment of the invention.

FIG. 4 depicts schematically a luminaire LU according to an embodiment of the invention. The luminaire LU comprises a driver system DS and a light source LS. Input to the driver system is energy I which may come from mains and is rectified by a power source PS, but the power source PS may also be a battery, so that no external input I is required. An output of the power source PS is fed to a light driver LD where for instance filtering may take place and where energy is outputted in a form, for instance a current, that is suitable to drive the light source.

The driver system DS of FIG. 4 further comprises a control unit CU and a modulator M, wherein the modulator M is configured to modulate the energy provided to the light source. The modulator may e.g. be configured to modulate a current as provided to the light source, thereby e.g. providing a sequence of different current levels that are maintained during different periods. In an embodiment, the modulator M may be configured to provide in a nominal current level and a zero current level. In such embodiment, the modulator M thus acts like an on/off switch. As schematically shown in FIG. 4, the modulator M and the light driver LD are controlled by the control unit CU so that a predetermined waveform of energy is provided to the light source to illuminate the surroundings and for VCL.

The control unit is configured to carry out the method according to the invention, so that the control unit determines the different current levels and periods of time these different current levels need to be maintained in order to transmit a code using the light source, wherein the control unit ensures that the transition between different current levels takes more than one set-point update period thereby reducing the risk of flicker being perceived by a human observer and/or the risk of interference with other optical read-out devices. As such, the control unit may be configured, in an embodiment, to determine an array of set-point values, the array of set-point values providing in a gradual change between different current levels which form the code and provide the array of set-point values to the light driver LD or the light driver LD and the modulator M. In an embodiment, the control unit may be configured to receive a signal representative of the code to be transmitted by the light source and convert the code into a sequence of different current levels, which current levels are maintained for a predetermined period of time. In such embodiment, the control unit CU may further be configured to control the light driver or the light driver and the modulator to provide the sequence of different current levels to the light source LS such that the light source emits light at the different intensity levels. In accordance with the present invention, the array of set-point values are used at a set-point update rate having a set-point update period, the sequence of consecutive set-point values of the array of set-points being such that transitions between the different current levels take more than one set-point update period.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfil the functions of several items recited in the claims.

The invention claimed is:

1. A method for driving a light source, said method comprising the following steps:
   a. providing a code to be transmitted by the light source;
   b. converting the code into a sequence of different current levels, which current levels are maintained for a predetermined period of time; and
   c. providing the sequence of different current levels to the light source such that the light source emits light at different intensity levels,
   wherein driving the light source is carried out using a set-point update rate having a set-point update period, and
   wherein transitions between the different current levels take more than one set-point update period.

2. The method according to claim 1, wherein the set-point update rate is predetermined.

3. The method according to claim 1, wherein the set-point update rate has a minimal set-point update period, transitions between the different current levels take more than one minimal set-point update period.

4. The method according to claim 1, wherein a transition between different current levels comprises a transition from a first current level to a second, different, current level.

5. The method according to claim 4, wherein the transition from the first current level to the second, different, current level includes using at least one intermediate set-point value in a range between, but not including, a first set-point value corresponding to the first current level and a second set-point value corresponding to the second current level.

6. The method according to claim 5, wherein driving the light source comprises:
   using the first set-point value corresponding to the first current level prior to the transition from the first current level to the second, different current level and
   using the second set-point value corresponding to the second current level after the transition from the first current level to the second, different current level.

7. The method according to claim 1, wherein the sequence only comprises two different current levels that are alternated, and wherein the frequency with which the two different current levels are alternated is varied to form the code.

8. The method according to claim 1, wherein the sequence comprises three or more different current levels alternated at a fixed frequency, and wherein the order of the three or more different current levels forms the code.

9. The method according to claim 1, wherein an average intensity of the by the light source emitted light is adjusted by adjusting a duty cycle of the modulated light source.

10. The method according to claim 1, wherein the method comprises the step of monitoring the average intensity of the emitted light and adjusting the duty cycle to compensate for intensity deviations caused by the transitions between different current levels.

11. The method according to claim 1, wherein the code is converted into a sequence of different current levels without using a zero current level.

12. The method according to claim 1, wherein a sequence of codes is transmitted by the light source, and wherein in between the transmittal of the respective codes a constant current is provided to the light source for a predetermined period of time.

13. A driver system configured to drive a light source, the driver system comprising:
  a light driver that is configured to receive energy from a power source into a form suitable for the light source;
  a modulator for modulating the energy outputted by the light driver; and
  a control unit;
  wherein the light driver and the modulator are configured to output different current levels at an outlet that is connectable to the light source;
  wherein the control unit comprises an input for receiving a signal representative of the code to be transmitted by the light source,
  wherein the control unit is configured to:
    convert the code into a sequence of different current levels, which current levels are maintained for a predetermined period of time; and
    control the light driver and the modulator to provide the sequence of different current levels to the light source via the outlet such that the light source emits light at the different intensity levels;
  whereby the control unit is configured to generate an array of set-point values for controlling the light driver and the modulator, in accordance with the sequence of different current levels,
  wherein the array of set-point values are used at a set-point update rate having a set-point update period, and
  wherein the control unit is configured such that transitions between the different current levels take more than one set-point update period.

14. A luminaire comprising a light source and a driver system according to claim 13.

* * * * *